A. A. ADAMSON.
ROUND PACKAGE LABELING MACHINE.
APPLICATION FILED NOV. 30, 1918.
1,435,680.                                      Patented Nov. 14, 1922.
                                                     5 SHEETS—SHEET 5.
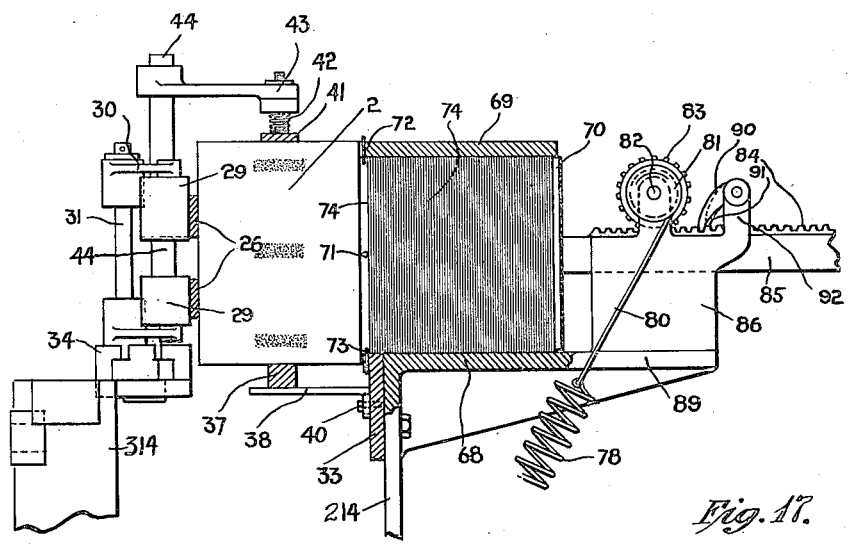
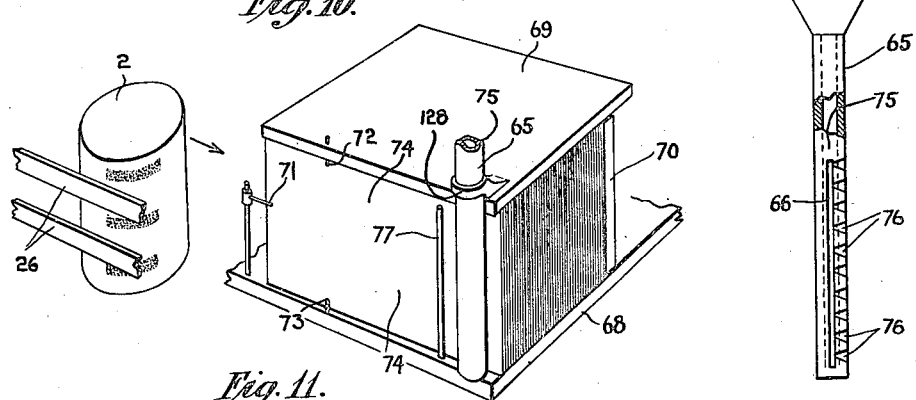
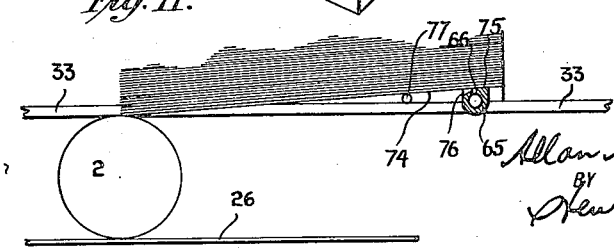

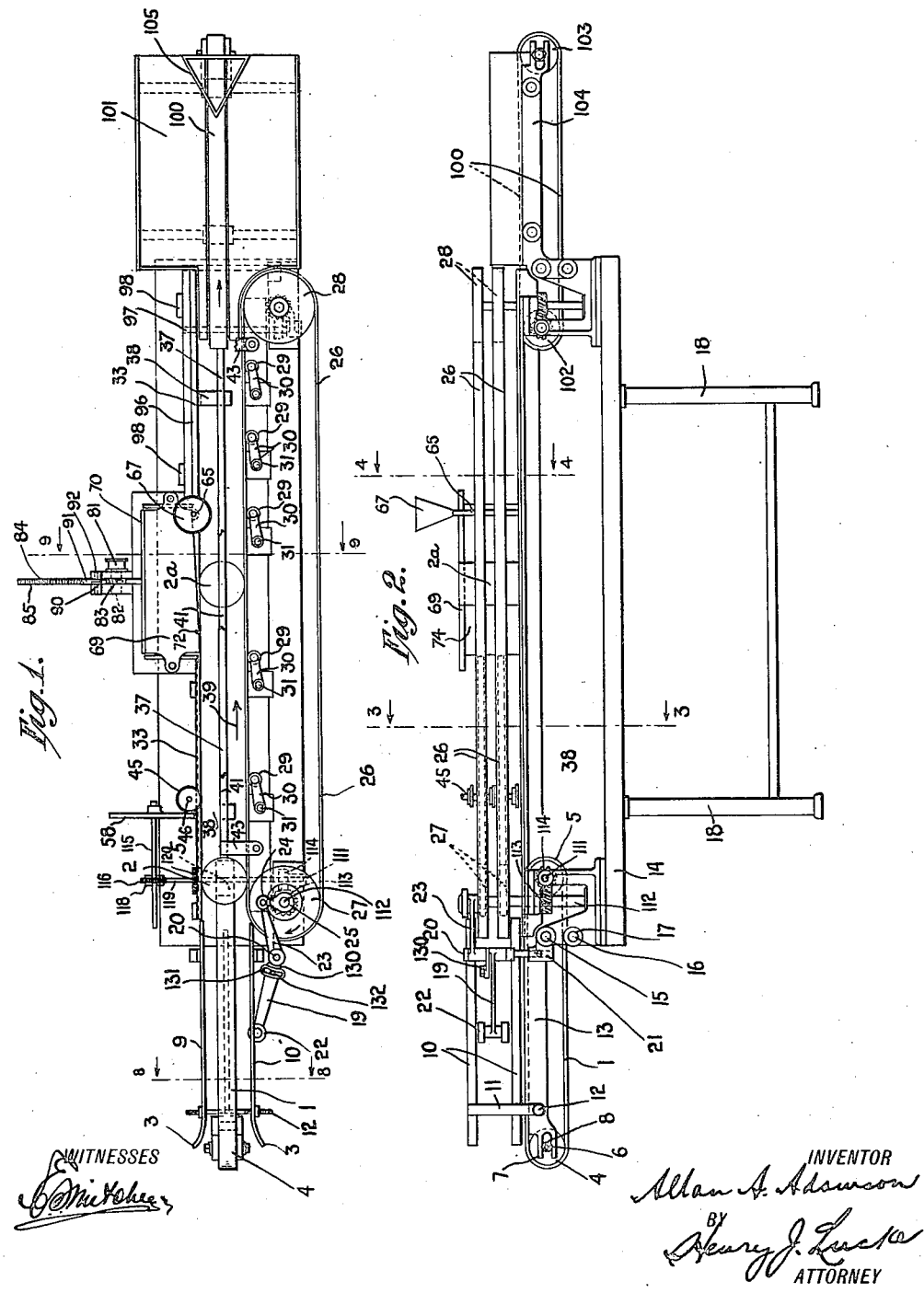

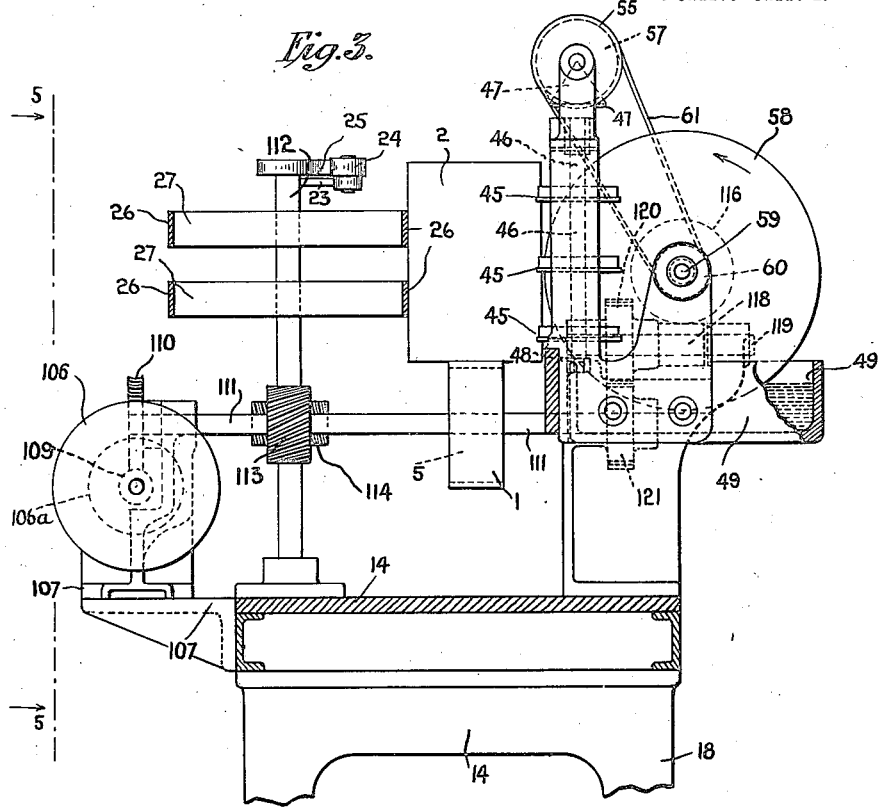

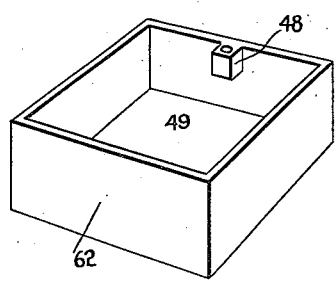
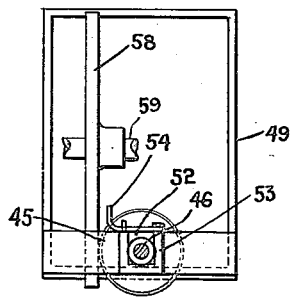
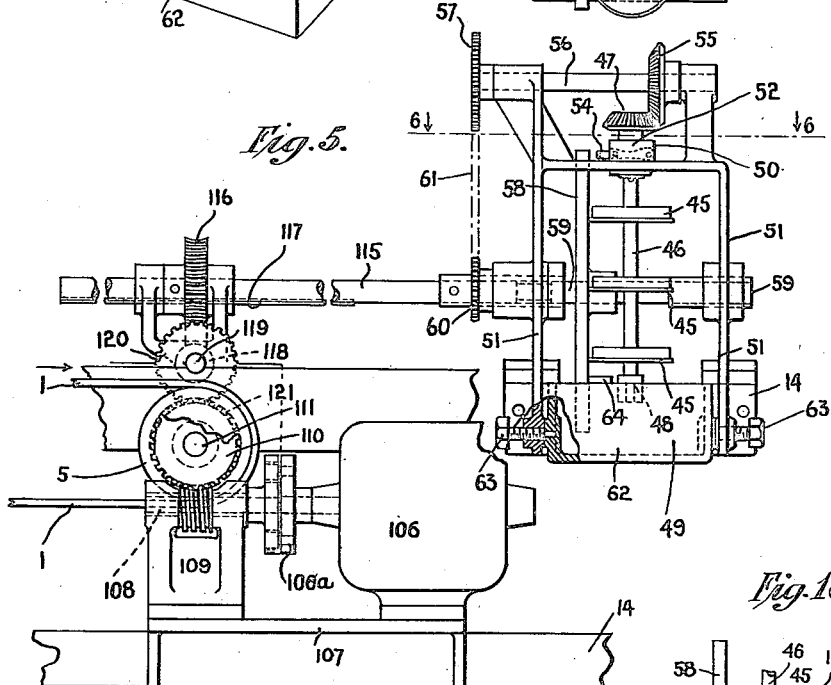
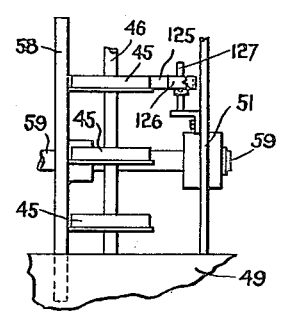
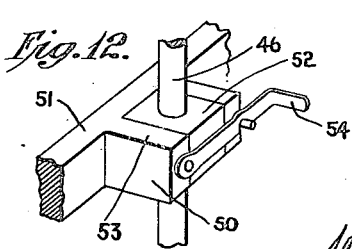

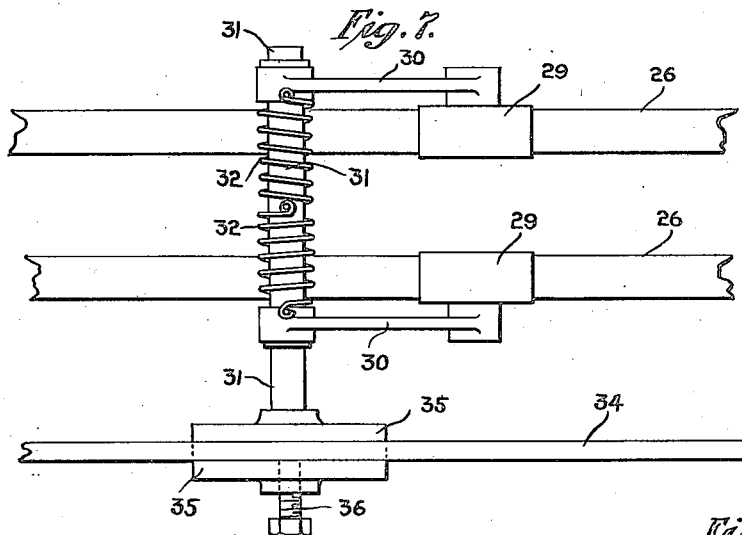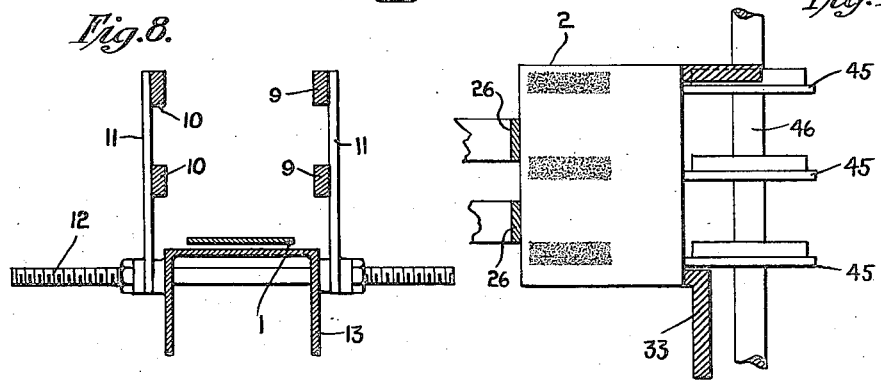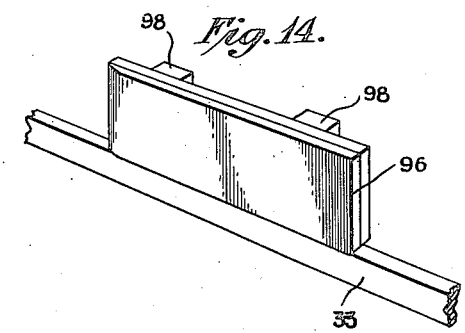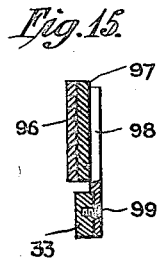

Patented Nov. 14, 1922.

1,435,680

UNITED STATES PATENT OFFICE.

ALLAN A. ADAMSON, OF BROOKLYN, NEW YORK.

ROUND-PACKAGE-LABELING MACHINE.

Application filed November 30, 1918. Serial No. 264,768.

*To all whom it may concern:*

Be it known that I, ALLAN A. ADAMSON, a citizen of the United States of America, residing at Brooklyn, county of Kings, State of New York, have invented certain new and useful Improvements in Round-Package-Labeling Machines, of which the following is a specification.

This invention relates to machines for labeling round cans and other packages and articles of circular and other round contour.

More particularly the invention is directed to means for applying a label to such round package under conditions to preclude the leakage or escape of the contents of the package during the stage of labeling. In the most preferred form of the invention, the cans are conveyed in substantially vertical position, with the cover or top uppermost.

The invention is further directed to means for insuring the register of the ends of the label upon being applied to the round package.

A further object of the invention is the provision of improved means for feeding the labels horizontally into the labeling device or portion of the labeling machine.

A further feature of the invention is the improvement of the adhesive applying means for positively insuring sufficient adhesive to effectively bind the label but precluding the escape of adhesive onto the outer face or movable part of the machine.

The invention provides for adjustable guide and conveying means for accommodating the machine for different sizes of cans.

The machine elements are individually and combinedly arranged to permit removability or accessibility for the purpose of cleaning and for replenishing the adhesive supplying means without disturbance of other parts of the machine.

Further features and objects of the invention will be more fully understood from the following description and the accompanying drawings, in which—

Fig. 1 is a top plan view of an embodiment of my invention, certain parts being removed for the sake of clearness;

Fig. 2 is a side elevation of Fig. 1;

Fig. 3 is a vertical sectional elevation taken on line 3—3 of Fig. 2, on an enlarged scale;

Fig. 4 is a sectional elevation on line 4—4 of Fig. 2, on an enlarged scale;

Fig. 5 is a sectional elevation on line 5—5 of Fig. 3;

Fig. 6 is a sectional elevation on line 6—6 of Fig. 5;

Fig. 7 is an elevation, on a greatly enlarged scale, of the conveying means and associated pressure rollers;

Fig. 8 is a detail sectional view on line 8—8 of Fig. 1, on an enlarged scale;

Fig. 9 is a detail sectional view on line 9—9 of Fig. 1, on an enlarged scale;

Fig. 10 is a detail diagrammatic perspective view showing a can approaching the labeling portion of the machine;

Fig. 11 is a detail diagrammatic view showing a can in initial engagement with the label to be applied thereto;

Fig. 12 is a detail perspective view of a separable bearing of the adhesive applying rollers;

Fig. 13 is a perspective view of the gum box;

Figs. 14 and 15 are front perspective and vertical sectional views of the resilient pressure pad of the squee-geeing means;

Fig. 16 is a diagrammatic vertical sectional elevation showing the gum applied by the adhesive rollers to the face of the can;

Fig. 17 is an elevation of the adhesive applying tube; and

Fig. 18 is a detail vertical elevation of a modified form of adhesive applying means for controlling the extent of the amount of adhesive applied to the face of the can.

The labeling machine comprises generally means for feeding the cans in non-horizontal position, preferably in vertical position, means for applying adhesive to the portion of the outer face of each can whereon the label is to be applied, means for feeding labels to the successive cans and means for squee-geeing the label on each can to insure positionment of the label.

The particular embodiment shown in the drawings is adopted to apply a label about the complete periphery of the can or other round package by instrumentalities insuring register of the exposed edges of the top of the label. The adhesive applied about the surface of the can or other round package is effected by means effective prior to applying the label and is constructed to be regulatable for varying the extent of adhesive thus applied. Supplemental adhesive supplying means is employed to apply adhesive to the end of the label forming the lap.

In the specification herein, the term "can" is employed to include any suitable round package, whether of metal or other material or of circular or other round contour.

Referring to the specific embodiment shown in the drawings, the can feeding means comprises the feeding belt 1, serving to support and convey each can 2 in a vertically upright position inwardly of the machine from the inwardly flaring guides 3. Such belt 1 is shown mounted on the outwardly disposed pulley 4 and the inwardly disposed pulley 5, one of said pulleys being preferably adjustable in its bearings, as indicated in respect to the pulley 4 as by rotatably mounting the same on stud 6, extending into the slotted bearings 7, and adjustably positioned therein in fixed relation by means of the nuts 8.

Laterally of the conveying belt 1 are arranged the oppositely disposed guide members 9, 10, and preferably each comprising a plurality of vertically spaced bars. The bars 10 are adjustably mounted on the posts 11 adjustably supported on the respective threaded studs 12, held in the frame 13, and positioned by nuts, as shown in Fig. 8.

The frame 13 is supported on the main bed 14 of the machine in removable or knockdown relation, as by pivoting the frame 13 thereto at 15, and locking the same in operative position by pins 16 passing through the registering openings 17 at opposite sides of the frame 13 and within the bed 14. The main bed 14 is supported by the legs 18.

Means are provided for regulating the feed of the cans, and as shown, comprises the arrester 19 pivotally mounted on the pivot stud 20 supported in the recessed bracket 21. Such arrestor 19 is provided with the head 22 adapted to extend through the spaced guide bars 10 and thereby to be brought in front of the foremost can, as successively fed by the conveyor belt 1. The arrester 19 is shown of the oscillating type and is controlled by its operating arm 23, carrying the cam roller 24 cooperating with the cam 25.

In the position of the arrester head 22, shown in Fig. 1, the same has been oscillated to its maximum outward position, whereupon the can 2 after having been previously arrested has been conveyed forwardly to the position shown in Fig. 1, by means of the belt 1, which position is substantially the most forward position of feeding effected by the belt 1.

Means are provided for further progressing the cans from such most forward position, such progressing means being shown as the belt 26 having its effective face disposed vertically and extending about the horizontally rotating pulleys 27, 28, disposed at opposite positions of the labeling machine. Preferably, such belt 26 comprises a pair of spaced, similarly extending individual belts, mounted on pairs of spaced similar pulleys 27, 28, as shown. Intermediate the pulleys 27, 28, and on the effective portions of the belts 26 are disposed the inwardly tensioning or pressure rollers 29, respectively mounted on the arms 30, loosely pivoted on the studs 31 and respectively tensioned by individual spiral springs 32, (see Fig. 7), for the purpose of distending the effective faces of the respective belts 26 against the surface of the cans 2. Disposed oppositely of the effective faces of the respective belts 26 is arranged the fixed guide bar 33, whereby upon travel of the belts 26 in the direction of the arrow 39, see Fig. 1, each can 2 is held in contact with the face of the guide bar 33 and rotated about its own axis, thereby progressing each can by rolling the same against the guide bar 33. Each pressure roller 29 is preferably mounted to be adjustably positioned on the supporting plate 34, by a clamp 35 having a set screw 36, as indicated in Fig. 7.

In the progressive travel effected by the belts 26, the cans ride on the lower rail 37, adjustably held by brackets 38 each provided with a vertical slot receiving a set bolt 40 tapped into the bar 33, as shown in Fig. 9. The upper guide rail 41 serves to prevent any can from rising unduly and to such end is yieldably held in position under tension by the springs 42 on the arms 43, carried by the studs 44 adjustably mounted on a portion 314 the main bed of the machine. Accordingly, the upper and lower rails are adjustable for regulating the path of movement of the cans and for different heights of cans.

Thus the can is effectively prevented from undesired displacement in any direction and substantial accuracy of the registry of the label with the can is thereby obtained independent of minor variations in the can structure and independent of minor variations in the bed of the machine, as well as of vibration.

The adhesive applying rollers 45, shown as three in number, see Figs. 1, 5 and 16, are mounted on the common spindle 46 carrying at its upper end the bevel gear 47. The lower bearing 48 may be a fixed shallow cup socket suitably supported on a side of the gum box 49 and the upper bearing 50 supported by the frame 51, carried by the main bed 14. Said upper bearing 50 preferably comprises a removable bearing box 52, see Figs. 6 and 12, slidable in the recessed arm 53, and locked by the latch 54.

As indicated, such applying rolls 45 rotate in substantially horizontal planes, the rotation being effected by the bevel gear 47 meshing with bevel gear 55 mounted on the shaft 56 and driven by the sprocket 57.

In feeding relation with the supplying rolls 45 is arranged the feed disk 58 rotatably mounted in a vertical plane on the shaft 59 carrying the sprocket 60. The sprocket 60, driven by suitable means described hereinafter, drives the sprocket 57 by means of the chain 61.

The feeding disk 58 at its lower portion thereof extends into the gum or adhesive reservoir 49 suitably supported in the frame 51 to be removable therefrom, as by means of the set bolts 63. The scraper 64, adjustably supported on the frame 51 relative to the plane of rotation of the feed disk 58, serves to regulate the thickness of the film or layer of gum fed by the feeding disk 58 to the applying rolls 45.

The label feeding means, see Figs. 4 and 9, comprises the lower plate 68, the adjustable upper plate 69, the plunger 70 and means for positioning the foremost label in proper relation to the path of travel of the cans and for applying adhesive to a certain portion of the face of each label. Such adhesive applying means comprises the tube 65 provided with the vertical slot 66 communicating with the bore of the tube and the funnel 67 communicating with the upper opening of the tube 65. Such positioning means comprsies the lateral label finger 71, the upper label finger 72 and lower label finger 73 and also the adhesive supplying tube 65, serving also to hold the lap end of the foremost label 74.

Such tube 65 is preferably provided with a flat face 75, against which the foremost label 74 is brought into engagement. As is indicated in Figs. 10 and 11, the foremost feeding position of each successively foremost label 74 is somewhat inclined to the path of travel of the cans 2.

The portion of the label 74 brought against the flat face 75 of the tube 65 is preferably the lap end of the label and accordingly I prefer to provide auxiliary adhesive applying means, such as the set of recesses 76, disposed in spaced relation on the flat face 75 and preferably increasing in vertical height and horizontal depth in the direction of withdrawal of the label 74 when being applied to the can 2. For the purpose of curling each label 74, upon being withdrawn from the label feeding means, I arrange the rod 77, suitably fixed to the bar 33, whereby the label 74 being slipped past the rod 77 is curled at its lap end in the direction of curvature of the can and thus inherently tends to hug the can when the lap end is being applied.

The label plunger 70 is operated under suitable tensioning means, such as the coiled retractile spring 78, having its one end attached to any suitable fixed support, as the eye 79, on the bed 14, and its free end connected to the cord or chain 80 wound about the pulley 81 fixed on the shaft 82, on which is also fixed the gear 83, the teeth of which mesh with the teeth of the rack 84, on the arm 85 of the plunger 70. The arm 85 is slidably supported in the recessed guide block 86, carried by the bracket 89, fixed to a portion 214 of main bed 14 and also supporting the lower plate 68 of the label feeding means.

In commercial operation it has been found that labels composed of the character of paper usually employed for this purpose do not lie in horizontal position in a thoroughly satisfactory manner, since there is some bending or crinkling of the upper portion of the pile. Such variations in the position of the uppermost label result in improper application of it to the can and result in turn in a finished can of poor appearance. The label supplying means of the present invention is constructed to support the labels all in a vertical plane and by means of my improved construction, they are reliably supported without appreciable variation in the plane either among themselves or taken in relation with the plane of the can.

Means are provided for precluding any displacement of the plunger arm 85 and consequently of the labels in the label supplying means due to impact of each can against the foremost label, and as one such means I have shown the pair of pawls 90, 91, adapted to alternately engage a tooth of the rack 84 and accordingly said pawls 90, 91 are effectively displaced one-half of the pitch of the teeth 84. Said pawls 90, 91 are loosely pivotally mounted on the arm 92 of the guide block 86.

Upon application of each label to the can and the gummed lapped edge applied in overlapping relation to the initially applied edge of the label, the conveying means 26 continues the movement of the can and effects the squee-geeing of the label on the can. Such squee-geeing means preferably comprises a relatively fixed laterally disposed resilient support, such as the rubber pad 96, see Figs. 14 and 15, mounted on a preferably adjustable support, such as the base 97 carried by the uprights 98 respectively adjustably positioned to the guide bar 33 by means of the threaded screws 99. Such pad 96 is preferably normally spaced from the lowerly disposed guide bar 33 to provide a clearance for the displacement of such pad 96 when the can is being forcibly rolled thereagainst by the conveying belts 26 under tension of the pressure rolls 29.

One of the pressure rolls 29 is located in contrary position to the resilient pad and the amount of presure to which the can is subjected at the time of its contact with said resilient pad, may be varied by suitable adjustment of the pressure roll 29 opposite thereto.

After passing the squee-geeing means the cans are conveyed by the conveying belt 100 to the discharge table 101. Such belt 100 corresponds to the initially conveying belt 1 and is similarly mounted on the pulleys 102, 103, journaled on the frame 104. The V-shaped dispersing means 105 is suitably positioned across the belt 100 to distribute the labeled cans as delivered to the table 101.

The machine may be driven from any suitable shafting (not shown) or by an individual motor, such as the electric motor 106, see Figs. 3 and 5, shown bolted to the removable bracket 107 carried by the main bed 14 of the machine.

The shaft of the motor 106 through the float coupling 106ª drives the shaft 108 to which is fixed the worm 109 meshing with the worm wheel 110 on the shaft 111. The driving pulley 5 of the forward conveying belt 1 is fixed on the shaft 111.

For the purpose of driving the intermediate conveying belts 26, the respective driving pulleys 27 are mounted on the common shaft 112, to which is fixed the spiral gear 113 meshing with the spiral gear 114 on the shaft 111. The cam 25 controlling the arrester 19 is fixed on the shaft 112 as is indicated in Fig. 1.

The delivery conveying belt 100 is driven by the driving pulleys 27 of the intermediate conveying belt through similar intermeshing spiral gears, (not shown), corresponding to the aforesaid spiral gears 113, 114, as aforesaid.

Each shaft 112 is mounted in suitable bearings adapted to be movable in the direction parallel to the direction of length of the shaft 111, the spiral gears 113, 114 accommodating such movement while maintaining meshed relation. Such movability of the shaft 112 attains adjustment of the intermediate conveying belts 26 for different widths of cans.

The shaft 46 of the gum applying rollers 45 is driven by the sprocket 60 as aforesaid, which sprocket 60 is mounted on the shaft 115, on which is mounted the worm wheel 116, movable longitudinally on the shaft 115 by means of the key 117. The worm wheel 116 meshes with the worm 118, on the shaft 119 driven by the shaft 111 by the intermeshing spur gears 120, 121.

When it is desired to apply "spots" of adhesive on the surface of the can by spaced adhesive rollers 45, the rollers are rotated at a speed less than the speed of rotation of the can as the can encounters the rollers. Such positively actuated rotation of the applying rollers at a speed differential to that applied to the can ensures positive deposition of the gum or other adhesive. When it is desired to apply one or more zones of adhesive continuously about the periphery of the can, the arrangement shown in Fig. 18 is utilized, wherein, say the uppermost roller 45 is supplied with the supplemental adhesive applying belt 125, such as of rubber, extending about such roller 45, and held in position by an idler 126 suitably mounted on a stud 127 carried by the frame 51. Thus, upon rotation of the shaft 46 and the feed of the gum or other adhesive by means of the feed wheel 58, the adhesive applying belt 125 will be supplied with gum similarly as in respect to the applying rollers 45 as aforesaid. In the labeling of slip-cover cans, it is often desired that a continuous zone of gum or other adhesive be applied at the line of juncture of the cover and the can, to hold the cover onto the can in sealed relation therewith.

As noted above, the cans after being filled with the desired contents, are fed promiscuously to the initial conveying belt 1 and the advance of the cans controlled by the arrester 19, which is suitably timed by a corresponding cam in its oscillatory stroke to effect the desired headway between the cans, as is indicated in Fig. 1 by the relative positions of the two cans designated respectvely 2 and 2ª.

Preferably, as is indicated in Fig. 1, the arrester arm 19 is loosely pivotally mounted on the pivot stud 20 while the short arm 130 fixed to the operating arm 23, is provided with the segment adjusting slot 131 receiving the pin 132 from the arm 19, which pin 132 may be clamped in the desired adjustable position in the slot 131 in correspondence to the different diameters of cans.

The deposition of the spaced spots or zones of gum on the surface of the can 2 applied by the spaced rollers 45 or equivalent, is preferably in planes noncoincident with the zones of contact of the conveying belts 26, as is indicated in Fig. 16. It will be noted that the pressure rollers 29, coacting with the intermediate conveying belt 26, are advantageously positioned respectively opposite to the multiple adhesive rollers 45, opposite the initial taking up of the anterior edge of the label, opposite the withdrawal of the lap or posterior edge of the label and at a plurality of locations opposite the rubber pad, particularly at the location when the lap end of the label is in contact with the pad.

As also noted above, the machine generally is adjustable in width and height of the runway of the cans to accommodate different sizes of dimensions of cans.

Labels are replenished in the label supplying means by merely withdrawing the arm 85 of the label plunger 70 and inserting the additional labels in advance of the plunger 70. The supply of adhesive to the adhesive supplying tube 65 may be continuous, as by the use of a timed or otherwise controlled gravity supplied tube communicating with a suitable source, or the adhesive supplied intermittently manually directly into the funnel 67. The supply of gum or other adhesive into the gum box 49 may be done intermittently, or otherwise, as is apparent. As indicated above, the adhesive supplying rollers 45 may be removed from position as a unit, without disturbing other portions of the machine as is desirable when cleaning the parts. The adhesive tube 65 is similarly removably positioned by being passed through suitable openings respectively in the boss 128, of the upper plate 69 and in the lower plate of the label feeding means.

It will be noted that the base 68 of the label feeding mechanism is substantially parallel to the plane of travel of each can whereby the lower and upper edges of the foremost label 74 is maintained substantially parallel to the direction of travel of the can, and accordingly upon the application of the label to the face of the can the pull on the label exerted by the can in its rolling motion is substantially uniform and the upper and lower edges of the lap end of the label are respectively brought in register with the upper and lower edges of the anterior end of the label. As is indicated above, the path of travel of the can, by reason of the adjustability of the supporting brackets 38 of the lower rail 37, can be varied or regulated relative to the position of the labels.

I claim.

1. The combination of means for labeling a can in upright position, comprising a straight trackway including bottom supporting means, a fixed lateral guiding means disposed on one side of said bottom supporting means and top guiding means, means for supplying labels in upright position, said supplying means comprising a base in fixed relation to said lateral guiding means, means for adjusting the position of said bottom supporting means relative to said base and means for adjusting the position of said top guiding means relative to said base.

2. The combination of means for labeling a can in upright position, comprising a straight trackway including bottom supporting rail, a fixed lateral guiding means disposed on one side of said bottom supporting rail, top guiding means, means for supplying labels in upright position, said supplying means comprising a base in fixed relation to said lateral guiding means, means for adjusting the position of said bottom supporting rail relative to said base and means for adjusting the position of said top guiding means relative to said base.

3. The combination of a trackway for conveying a can in upright position including bottom supporting means, lateral guiding means disposed on one side of said bottom supporting means and a movable member disposed laterally of said bottom supporting means and opposite said lateral guiding means, means for supplying labels in upright position, said supplying means comprising a base in fixed relation to said lateral guiding means and means for adjusting the position of said movable element relative to said lateral guiding means.

4. The combination of a trackway for conveying a can in upright position including bottom supporting means, lateral guiding means disposed on one side of said bottom supporting means and a movable member disposed laterally of said bottom supporting means and opposite said lateral guiding means, means for supplying labels in upright position, said supplying means comprising a base in fixed relation to said lateral guiding means, a plurality of independently adjustable means for adjusting the position of said movable element, a plurality of independently adjustable means for varying the position of said movable element relative to said lateral guiding means and means for varying the position of said bottom supporting means relative to said lateral guiding means.

5. The combination of a trackway for a can in upright position, said trackway including bottom supporting means, means for feeding labels in a substantially vertical and uniplanar position, comprising a substantially horizontal member supporting the labels, said horizontal member being disposed in direct adjacency to and extending along one side of said trackway, means for moving a can along said trackway on said bottom supporting means and for effecting contact between the foremost label and the can, a plurality of independently adjustable means for varying the positioning of said movable means relative to said label supplying means and adhesive applying means operative upon movement of the label.

6. The combination of a trackway for a can in upright position, said trackway including bottom supporting means, means for feeding labels in a substantially vertical and uniplanar position, comprising a substantially horizontal member supporting the labels, said horizontal member being disposed in direct adjacency to and extending along one side of said trackway, means for moving a can along said trackway on said bottom supporting means and for effecting contact between the foremost label and the can, a plurality of independently adjustable means for varying the positioning of said movable means relative to said label supplying means and adhesive applying means operative upon movement of the can.

7. The combination of a trackway for a can in upright position, said trackway including bottom supporting means, means for feeding labels in a substantially vertical and uniplanar position, comprising a substantially horizontal member supporting the labels, said horizontal member being disposed in direct adjacency to and extending along one side of said trackway, means for moving a can along said trackway on said bottom supporting means and for effecting contact between the foremost label and the can, a plurality of independently adjustable means for varying the positioning of said movable means relative to said label supplying means and adhesive applying means operative upon movement of the can and the label.

8. The combination of a trackway for a can in upright position, said trackway including bottom supporting means, means for feeding labels in a substantially vertical and uniplanar position, comprising a substantially horizontal member supporting the labels, said horizontal member being disposed in direct adjacency to and extending along one side of said trackway, means for moving a can along said trackway on said bottom supporting means and for effecting contact between the foremost label and the can, a plurality of independently adjustable means for varying the positioning of said movable means relative to said label supplying means, means operative upon movement of the can for applying adhesive to a face of the can and separate adhesive means for applying adhesive to a portion of the label.

9. The combination of a trackway for a can in upright position, said trackway including bottom supporting means, means for feeding labels in a substantially vertical and uniplanar position, comprising a substantially horizontal member supporting the labels, said horizontal member being disposed in direct adjacency to and extending along one side of said trackway, means for moving a can along said trackway on said bottom supporting means and for effecting contact between the foremost label and the can, a plurality of independently adjustable means for varying the positioning of said movable means relative to said label supplying means, means operative upon movement of the can for applying adhesive to a face of the can and separate adhesive means for applying adhesive to a portion of the label operative upon movement of the label relative to its adhesive applying means.

10. The combination of a substantially rectilinear trackway for a can in upright position, said trackway including substantially rectilinear bottom supporting means, means for feeding labels in a substantially vertical and uniplanar position comprising a substantially horizontal member supporting the labels, said horizontal member being disposed in direct adjacency to and extending substantially rectilinearly along one side of said trackway, means for moving a can along said trackway on said bottom supporting means and for effecting contact between the foremost label and the can, a plurality of independently adjustable means for varying the positioning of said movable means relative to said label feeding means and adhesive applying means.

11. The combination of a trackway for a can in upright position including bottom supporting means, lateral guiding means disposed on one side of said bottom supporting means and an adjustable member disposed laterally of said bottom supporting means and opposite said lateral guiding means, means for supplying labels in substantially upright position, said label supplying means comprising a base disposed directly adjacent to and extending in the direction of said lateral guiding means, means for moving the can along said trackway, said can moving means being disposed laterally of said bottom supporting means and opposite to said label supplying means and a plurality of adjustable means for varying the positioning of said can moving means relative to said label supporting means.

12. The combination of a substanially rectilinear trackway including bottom supporting means, substantially rectilinear lateral guiding means disposed on said side of said bottom supporting means, and an adjustable member disposed laterally of said bottom supporting means and opposite said lateral guiding means, means for supplying labels in substantially upright position, said label supplying means comprising a base disposed directly adjacent to and extending substantially rectilinearly in the direction of said lateral guiding means, means for moving the can along said trackway, said can moving means being disposed laterally of said bottom supporting means and opposite to said label supplying means and a plurality of independently adjustable means for varying the positioning of said can moving means relative to said label supporting means.

13. The combination of a trackway for a can in upright position including bottom supporting means, lateral guiding means disposed on one side of said bottom supporting means and an adjustable member disposed laterally of said bottom supporting means and opposite said lateral guiding means, means for supplying labels in substantially upright position, said label supplying means comprising a base disposed directly adjacent to and extending in the direction of said lateral guiding means, means for moving the can along said trackway, said can moving means being disposed laterally of said bottom supporting means and opposite to said label supporting means and a plurality of independently adjustable means for varying the positioning of said can moving means relative to said label supporting means, and relative to said lateral guiding means, and means for supplying adhesive to the labels, said adhesive supplying means being mounted in fixed relation to said base.

14. The combination of means for conveying a can in substantially vertical position, including a plurality of spaced belts engaging a lateral face of the can and thereby rotating the can a horizontally disposed stationary member for supporting said can on an end face thereof and means for applying adhesive to said lateral face at a portion thereof disposed between the regions of engagement of said spaced belts.

15. The combination of means for rotating a can while in vertical position including a movable member engaging a lateral face of the can and thereby rotating the same and a plurality of independently resilient pressure means engaging said movable member on a face thereof opposite to the face of said movable member in contact with said lateral face of the can.

16. In a can labeling machine, the combination of means for rotating a can while in vertical position including a movable member engaging a lateral face of the can and thereby rotating the same and resilient pressure means engaging said movable member on a face thereof opposite to the face of said movable member in contact with said lateral face of the can and means for adjustably positioning the portion of said movable member contrary to said pressure means.

17. In a can labeling machine, the combination of a substantially rectilinear trackway including a substantially horizontal bottom supporting means, an arrester extending normally within said trackway, means for moving said arrester transversely to the direction of length of said trackway, and means for moving the cans along said trackway, said can moving means comprising a belt having its effected face disposed substantially horizontally, said belt being disposed adjacent said trackway anteriorly of the normal position of said arrester.

18. In a can labeling machine, the combination of a substantially rectilinear trackway including a substantially horizontal bottom supporting means, an arrester extending normally within said trackway, means for moving said arrester transversely to the direction of length of said trackway, and means for moving the cans along said trackway, said can moving means comprising a belt having its effective face disposed substantially horizontally, said belt being disposed adjacent said trackway anteriorly of the normal position of said arrester, said can moving means further comprising a second belt having its effective face disposed substantially vertically, said second belt being disposed adjacent the trackway posteriorly of the position of said arrester.

19. In a can labeling machine, the combination of a trackway for a can in upright position including bottom supporting means and substantially rectilinear lateral guiding means disposed on one side of said bottom supporting means and means for moving a can along said trackway, said can moving means comprising a plurality of vertically disposed individual belts, the lowermost of said belts being disposed in substantially the same horizontal plane as said lateral guiding means and means for adjusting the horizontal position of said lowermost belt.

20. The combination of means for conveying a can in upright position and means for applyig a label to a face of said can while disposed on said conveying means, said label applying means comprising a recessed arm, a supply of adhesive communicating with the recess of said arm, means for locating said arm to engage with a label during the stage of applying the label to the face of the can.

21. The combination of means for conveying a can in upright position and means for applying a label to a face of the can while disposed on said conveying means, said label applying means comprising a tube provided with an opening emerging on an outer face of the tube and communicating with the interior of the tube, means for supplying adhesive to the interior of said tube and means for locating said tube to extend adjacent said conveying means and to engage a portion of the label, whereby said tube serves to position the label prior to and during the stage of applying the label to the face of the can.

22. In a can labeling machine, the combination of means for conveying a can in vertical position and means for applying a label to said can while in vertical position, said label applying means comprising a fixed adhesive applying member provided with a tubular portion having a substantially flat, substantially vertically extending face portion adapted to be engaged by a label, said face portion being provided with an opening and a plurality of recesses disposed on said substantially flat face portion.

23. In a can labeling machine, the combination of means for conveying a can in upright position and means for applying a label to a face of said can while in upright position, said label applying means comprising a base and an arm cooperating with said base to hold the labels in upright position on said base, said arm being hollow and having an opening extending to an outer face thereof in contact with a label, and adhesive supplying means communicating with the interior of said hollow arm.

24. The combination of a straight trackway for feeding cans in substantially upright position, including bottom supporting means and top guiding means, means for feeding labels in substantially vertical position including a base having its discharge portion extending to and along said trackway and means for adjusting the position of said bottom supporting means and said top guiding means.

25. The combination of a trackway for feeding cans in substantially upright position, including bottom supporting means and top guiding means, and means for resiliently mounting said top guiding means; means for feeding labels in substantially vertical position comprising a base having its discharge portion extending to and along said trackway; and means for adjusting the position of said bottom supporting means relative to said base.

26. The combination of a trackway for feeding cans in substantially upright position, including bottom supporting means and top guiding means, and means for resiliently mounting said top guiding means; means for feeding labels in substantially vertical position comprising a base having its discharge portion extending to and along said trackway; means for adjusting the positions of said bottom supporting means and said top guiding means relative to said base.

27. The combination of means for labeling a can in upright position comprising a straight trackway including a bottom supporting means, a fixed lateral means disposed on one side of said bottom supporting means, means for supplying labels in upright position, said supplying means comprising a base in fixed relation to said lateral means, means for adjusting the position of said bottom supporting means relative to said base and adhesive supplying means constructed to apply adhesive to said can disposed in anterior relation to said labeling supplying means.

In testimony whereof I have signed this specification this 18th day of November, 1918.

ALLAN A. ADAMSON.